(12) United States Patent
Yasui et al.

(10) Patent No.: US 10,690,690 B2
(45) Date of Patent: Jun. 23, 2020

(54) AUTOMATIC ANALYSER AND METHOD (71) Applicant: HITACHI HIGH-TECHNOLOGIES CORPORATION, Tokyo (JP)

(72) Inventors: Akihiro Yasui, Tokyo (JP); Saori Chida, Tokyo (JP); Masaaki Hirano, Tokyo (JP)

(73) Assignee: HITACHI HIGH-TECH CORPORATION, Tokyo (JP)

(*) Notice: Subject to any disclaimer, the term of this patent is extended or adjusted under 35 U.S.C. 154(b) by 289 days.

(21) Appl. No.: 15/567,758

(22) PCT Filed: Apr. 7, 2016

(86) PCT No.: PCT/JP2016/061441
§ 371 (c)(1),
(2) Date: Oct. 19, 2017

(87) PCT Pub. No.: WO2016/170994
PCT Pub. Date: Oct. 27, 2016

(65) Prior Publication Data
US 2018/0120340 A1    May 3, 2018

(30) Foreign Application Priority Data
Apr. 24, 2015    (JP) .................... 2015-089402

(51) Int. Cl.
*G01N 35/10*    (2006.01)
*G01N 21/31*    (2006.01)
*G01N 35/00*    (2006.01)

(52) U.S. Cl.
CPC .......... *G01N 35/1009* (2013.01); *G01N 21/31* (2013.01); *G01N 35/1004* (2013.01);
(Continued)

(58) Field of Classification Search
CPC .......... G01N 35/1009; G01N 35/1016; G01N 35/1004; G01N 21/31; G01N 35/10;
(Continued)

(56) References Cited

U.S. PATENT DOCUMENTS

2012/0134895 A1* 5/2012 Kanda .................... G01N 1/405
422/534
2012/0328487 A1    12/2012 Saito et al.

FOREIGN PATENT DOCUMENTS

JP    61-234335 A    10/1986
JP    04-252960 A    9/1992
(Continued)

OTHER PUBLICATIONS

International Search Report of PCT/JP2016/061441 dated Jul. 5, 2016.
(Continued)

*Primary Examiner* — Lore R Jarrett
(74) *Attorney, Agent, or Firm* — Mattingly & Malur, PC (57) ABSTRACT

Provided is a specimen dispensing mechanism that includes a specimen nozzle dispensing a specimen to be analyzed in a specimen chamber to a reaction chamber by suctioning and ejecting the specimen, and the specimen dispensing mechanism is controlled so as to perform a specimen suctioning process of inserting the specimen nozzle into the specimen chamber and suctioning the specimen in the specimen chamber, a liquid suctioning process of suctioning a liquid by the specimen nozzle after the specimen suctioning process, and an ejection process of ejecting the liquid and a portion of the specimen to the empty reaction chamber from the specimen nozzle in this order. Thereby, it is possible to provide an automatic analyser and a method which are capable of dispensing a small amount of specimen with a
(Continued)

high level of accuracy, without depending on the outer shape of a specimen nozzle or the viscosity of the specimen.

7 Claims, 6 Drawing Sheets

(52) U.S. Cl.
CPC ......... *G01N 35/1016* (2013.01); *G01N 35/10* (2013.01); *G01N 2035/00237* (2013.01)

(58) Field of Classification Search
CPC ....... G01N 2035/00237; G01N 1/4077; G01N 1/38; G01N 2001/4088; B01F 9/10; B01F 9/0016; B01F 9/20; B01F 9/002; B01F 9/00; B01F 15/00772; B01F 2215/0037; B01D 36/001; B01D 29/01
See application file for complete search history.

(56) References Cited

FOREIGN PATENT DOCUMENTS

| | | |
|---|---|---|
| JP | 06-273427 A | 9/1994 |
| JP | 2002-162401 A | 6/2002 |
| JP | 2010-096640 A | 4/2010 |
| JP | 2011-106828 A | 6/2011 |
| JP | 2013-007579 A | 1/2013 |

OTHER PUBLICATIONS

Extended European Search Report received in corresponding European Application No. 16783015.7 dated Dec. 3, 2018.
International Preliminary Report on Patentability received in corresponding International Application No. PCT/JP2016/061441 dated Nov. 2, 2017.

* cited by examiner

AUTOMATIC ANALYSER AND METHOD

TECHNICAL FIELD

The present invention relates to an automatic analyser and a method for performing quantitative and qualitative analysis of a biological specimen such as blood or urine.

BACKGROUND ART

Automatic analysers performing quantitative and qualitative analysis of a specific component included in a biological specimen (hereinafter, referred to as a specimen) such as blood or urine have been indispensable for the current diagnosis and the like because of high reproducibility of an analysis result and a high processing speed.

An analysis method (colorimetric analysis) using a reagent resulting in a change in the color of a reaction solution by reacting with a component to be analyzed in a specimen, an analysis method (immunity analysis) of counting markers by using a reagent, obtained by adding a marker to a material which is directly or indirectly and specifically coupled to a component to be analyzed in a specimen, and the like are known as a measurement method used in the automatic analyser, and analysis is performed by dispensing a specimen accommodated in a specimen chamber and a reagent accommodated in a reagent chamber to a reaction chamber by using a dispensing device or the like and mixing the specimen and the reagent.

As examples of the specimen chamber accommodating the specimen in the above-described analysis, a vacuum blood collection tube of which the inside is decompressed by an opening end being closed with a rubber cap or the like, and the like may be used as the specimen chamber, in addition to an open type specimen chamber having an opening in the upper portion thereof, and various specimen dispensing methods have been considered.

As a technique for dispensing a specimen from a closed specimen chamber such as a vacuum blood collection tube, for example, PTL 1 (JP-A-4-252960) discloses a sampling device including a sample carrier that moves a plurality of sample chambers to a sampling position, a side translation device which is installed to have a movement path in sampling position information, a vertical direction translation device which is mounted so as to be positioned on the side by the side translation device, a sampling probe which is moved to the inside and outside of the sample chamber by the vertical direction translation device in a vertical direction, a liquid pump which is connected to the probe so as to suction a sample out of the sample chamber, and controller means for moving both the translation devices and the pump to perform the suctioning operation, in which both the translation devices are liquid driving type actuators, the sample chamber is erected, and at least one sample chamber is closed.

CITATION LIST

Patent Literature

PTL 1: JP-A-4-252960

SUMMARY OF INVENTION

Technical Problem

In recent years, there have been increasing demands for an improvement in processing capability and a reduction in an analysis cost in automatic analysers, and there have been demands for a reduction in the amount of reagent to be used in an analysis method in which the reagent is added to a specimen, as described above. For this reason, a specimen to be used for one analysis in the automatic analyser is ordered to have a microliter of one digit, and thus there have been demands for high accuracy of dispensing.

On the other hand, as in the related art, in a case where a specimen is directly collected without opening a cap from a specimen chamber such as a vacuum blood collection tube of which an opening end is closed with a rubber cap or the like, a specimen nozzle of a dispensing device directly penetrates the rubber cap or the like and is immersed in a specimen within the specimen chamber, and thus it is necessary to consider an insertion load to be applied to the specimen nozzle. Therefore, a specimen nozzle used for the penetration of a rubber cap of a closed type specimen chamber is required to have an outer diameter larger than that of a specimen nozzle used in an open type specimen chamber and to have a shape in which the tip end thereof is sharpened, in consideration of a reduction in an insertion load to the rubber cap or the like.

However, in a case where the outer diameter of a specimen nozzle is large and the tip end thereof is sharp, the force of ejection is decreased due to a wide opening of the specimen nozzle, and the opening has to be inclined to the bottom surface of a reaction chamber, which makes it difficult for a specimen to separate from the tip end of the specimen nozzle. In particular, in a case where a specimen, such as whole blood or a centrifugally separated blood corpuscle, which has high viscosity is dispensed, it is extremely difficult to make the specimen get wet and spread on the bottom surface of the reaction chamber, and thus there is a problem in that the specimen is carried back to the specimen nozzle when the specimen nozzle separates from the reaction chamber.

The invention is contrived in view of the above-described problem, and an object thereof is to provide an automatic analyser and a method which are capable of dispensing a small amount of specimen with a high level of accuracy, without depending on the outer shape of a specimen nozzle or the viscosity of the specimen.

Solution to Problem

In order to accomplish the above-described object, the invention provides an automatic analyser including a specimen dispensing mechanism that includes a specimen nozzle dispensing a specimen to be analyzed in a specimen chamber to a reaction chamber by suctioning and ejecting the specimen, and a control unit that controls the specimen dispensing mechanism so as to perform a specimen suctioning process of inserting the specimen nozzle into the specimen chamber and suctioning the specimen in the specimen chamber, a liquid suctioning process of suctioning a liquid by the specimen nozzle after the specimen suctioning process, and an ejection process of ejecting the liquid and a portion of the specimen in this order from the specimen nozzle to the empty reaction chamber.

Advantageous Effects of Invention

According to the invention, it is possible to dispense a small amount of specimen with a high level of accuracy without depending on the outer shape of a specimen nozzle or the viscosity of a specimen.

DESCRIPTION OF EMBODIMENTS

Embodiments of the invention will be described with reference to the accompanying drawings.

First Embodiment

A first embodiment of the invention will be described in detail with reference to FIGS. 1 to 5.

Figure 1:
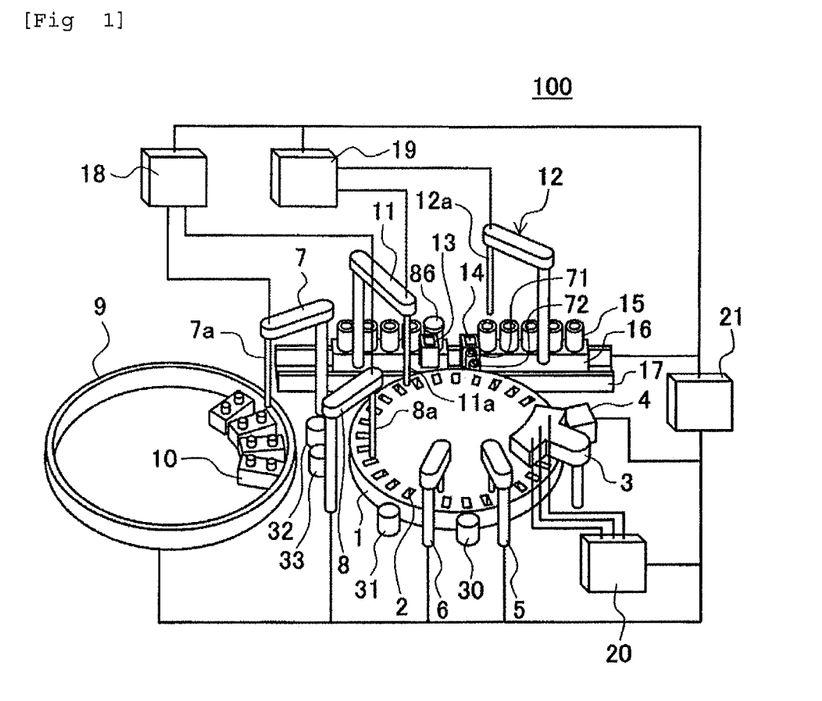
FIG. 1 is a schematic diagram illustrating the overall configuration of an automatic analyser according to a first embodiment.

FIG. 1 is a schematic diagram illustrating the overall configuration of an automatic analyser according to this embodiment.

In FIG. 1, an automatic analyser 100 schematically includes a specimen chamber 15 that accommodates a specimen to be analyzed, a specimen rack 16 that has one or more specimen chambers 15, a specimen transport mechanism 17 that transports the specimen rack 16, a reagent bottle 10 that accommodates a reagent used for the analysis of a specimen, a reagent disk 9 that has a plurality of reagent bottles 10 disposed side by side in the circumferential direction, a reaction chamber 2 that has a specimen and a reagent mixed and reacted with each other, a reaction disk 1 that has a plurality of reaction chambers 2 disposed side by side in the circumferential direction, first and second specimen dispensing mechanisms 11 and 12 that dispense a specimen to the reaction chamber 2 from the specimen chamber 15 transported to a specimen dispensing position by the specimen transport mechanism 17, reagent dispensing mechanisms 7 and 8 that dispense a reagent to the reaction chamber 2 from the reagent bottle 10, agitation mechanisms 5 and 6 that agitate a mixture (reaction solution) of the specimen and the reagent which are dispensed to the reaction chamber 2, a spectrophotometer 4 that measures the absorbance of the reaction solution by measuring transmitted light obtained from a light source, not shown in the drawing, through the reaction solution of the reaction chamber 2, a cleaning mechanism 3 that cleans the used reaction chamber 2, and a control unit 21 that controls the overall operation of the automatic analyser 100. The analysis of the automatic analyser 100 is performed by the spectrophotometer 4 measuring the absorbance of the mixture (reaction solution). The concentration and the like of a predetermined component of an analysis item based on a reagent are calculated from the absorbance. Meanwhile, in FIG. 1, a portion of connection between the mechanism and the control unit 21 which constitute the automatic analyser 100 is not illustrated for convenience of illustration.

The specimen chamber 15 mounted on the specimen rack 16 transported by the specimen transport mechanism 17 has an opening in the upper portion thereof, and includes a closed type specimen chamber (cap-closed chamber) in which an opening formed in the upper portion thereof is closed with a lid member 86 such as a rubber cap, and an open type specimen chamber (cap-opened chamber) which is opened by removing a lid member or the like provided in an opening formed in the upper portion thereof.

The first specimen dispensing mechanism 11 includes a specimen nozzle 11a having a tip end disposed facing downward, and a specimen pump 19 is connected to the specimen nozzle 11a. The first specimen dispensing mechanism 11 is configured to be rotated and vertically moved in a horizontal direction, and is configured such that the specimen nozzle 11a is inserted into an open type specimen chamber 15 to suction a specimen and is inserted into the reaction chamber 2 to eject the specimen, thereby dispensing the specimen to the reaction chamber 2 from the specimen chamber 15. In addition, the first specimen dispensing mechanism 11 inserts the specimen nozzle 11a into the reaction chamber 2 to suction the specimen (or a reaction solution), and ejects the specimen to another reaction chamber 2 to dispense the specimen (or a reaction solution) between the reaction chambers 2. A cleaning tank 13 for cleaning the specimen nozzle 11a by cleaning water is disposed in an operating range of the first specimen dispensing mechanism 11.

Figure 2:
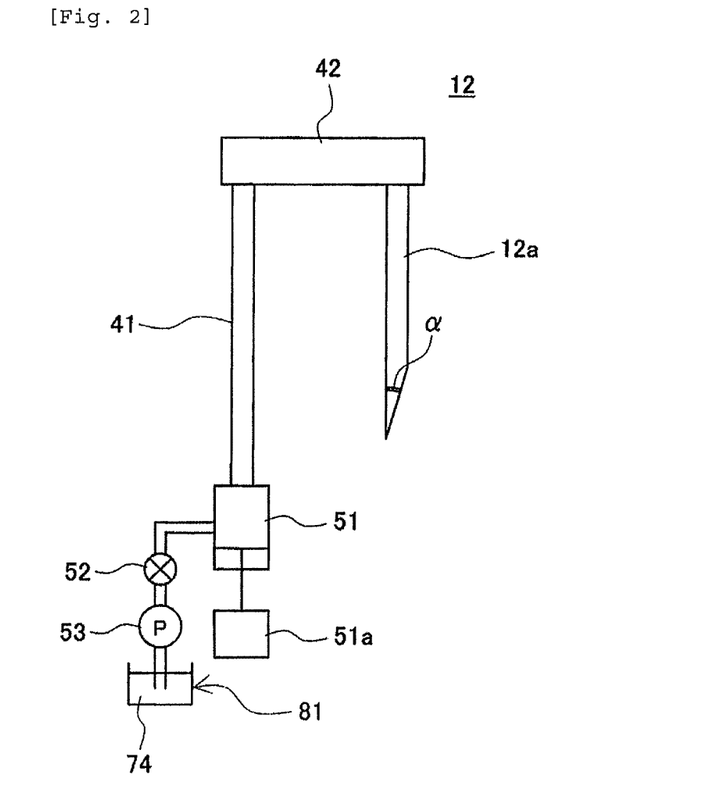
FIG. 2 is a schematic diagram illustrating a second specimen dispensing mechanism being taken out.

FIG. 2 is a schematic diagram illustrating a second specimen dispensing mechanism being taken out.

As illustrated in FIG. 2, the second specimen dispensing mechanism 12 includes an arm 42 which is disposed to extend in the lateral direction, a specimen nozzle 12a which is disposed on one end of the arm 42 and has a tip end facing downward, and an arm driving mechanism 41 which is disposed on the other end of the arm 42 and is rotated and vertically moved in the horizontal direction of the arm 42. A syringe pump 51 is connected to the specimen nozzle 12a through a pipe line (not shown) installed so as to penetrate the arm driving mechanism 41 and is driven by a syringe pump driving mechanism 51a. In addition, a pump 53 supplying system water 74, such as pure water, which is stored in a water tank 81 into the syringe pump 51 and the specimen nozzle 12a is connected to the syringe pump 51, and a pipe line connecting the pump 53 and the syringe pump 51 is provided with a solenoid valve 52 for opening and closing a pipe line (switching between circulation and blocking).

The lower end portion of the specimen nozzle 12a is formed to have an acute angle (for example, an angle α between the axial direction of the specimen nozzle 12a and the tip end of the specimen nozzle 12a is approximately 15 degrees to 20 degrees), and is configured to penetrate the lid member of the closed type specimen chamber 15. That is, the second specimen dispensing mechanism 12 inserts the specimen nozzle 12a into the open type specimen chamber 15 or the closed type specimen chamber 15 to suction a specimen and inserts the specimen nozzle 12a into the reaction chamber 2 to eject the specimen, thereby dispensing the specimen to the reaction chamber 2 from the specimen chamber 15.

A cleaning tank 14 for cleaning the specimen nozzle 12a by cleaning water, a liquid supply portion 71 which is disposed at a liquid suctioning position where liquid such as system water (pure water or the like) suctioned into the specimen nozzle 12a is stored, and a water droplet removing portion 72 which is disposed at a vacuum suctioning position and removes water droplets attached to the outer wall of the specimen nozzle 12a are disposed in the operating range of the second specimen dispensing mechanism 12.

Figure 3:
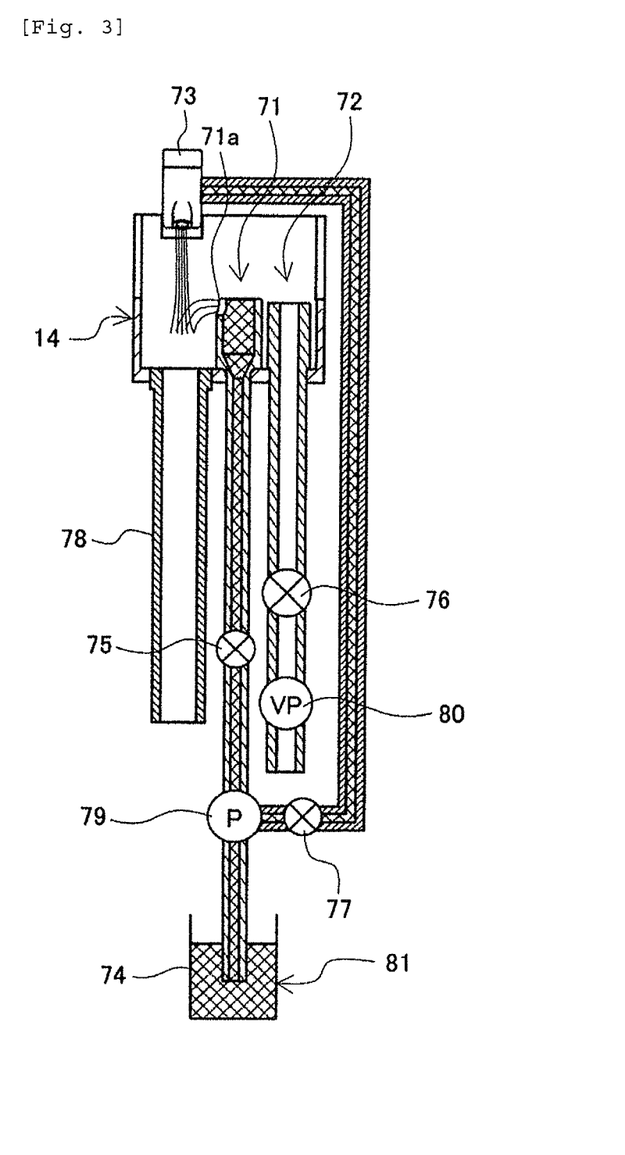
FIG. 3 is a schematic longitudinal sectional view illustrating a cleaning tank, a liquid supply portion, and a water droplet removing portion which are taken out.

FIG. 3 is a schematic longitudinal sectional view illustrating a cleaning tank, a liquid supply portion, and a water droplet removing portion which are taken out.

As illustrated in FIG. 3, the cleaning tank 14 is provided with a cleaning nozzle 73 that ejects the system water 74, stored in the water tank 81 and supplied by a pump 79, as cleaning water to clean the specimen nozzle 12a. In addition, a pipe line connecting the pump 79 and the cleaning nozzle 73 is provided with a solenoid valve 77 for opening and closing the pipe line (switching between circulation and blocking). In the cleaning tank 14, the cleaning water ejected from the cleaning nozzle 73 passes through a cleaning position at which the specimen nozzle 12a is cleaned, and is discarded to a waste liquid tank (not shown) through a waste liquid port 78 provided below the cleaning tank.

The system water 74 stored in the water tank 81 is supplied to the liquid supply portion 71 by the pump 79, and a pipe line connecting the liquid supply portion 71 and the pump 79 is provided with a solenoid valve 75 for opening and closing a pipe line (switching between circulation and blocking). The liquid supply portion 71 is disposed so as to be adjacent to the cleaning tank 14, and ejects a portion of the system water 74 to the cleaning position of the cleaning tank 14 from an ejection portion 71a provided on the cleaning tank 14 side of the liquid supply portion 71.

A vacuum pump 80 is connected to the water droplet removing portion 72, and a pipe line connecting the water droplet removing portion 72 and the vacuum pump 80 is provided with a solenoid valve 76 for opening and closing the pipe line (switching between circulation and blocking). In the water droplet removing portion 72, water droplets suctioned from the outer wall of the specimen nozzle 12a are discarded to a waste liquid tank (not shown) through the vacuum pump 80.

A reagent pump 18 is connected to the reagent dispensing mechanisms 7 and 8, and cleaning tanks 32 and 33 for cleaning reagent nozzles 7a and 8a of the respective reagent dispensing mechanisms 7 and 8 are disposed in the operating range of the reagent dispensing mechanisms 7 and 8. In addition, cleaning tanks 30 and 31 for cleaning agitation mechanisms 5 and 6 are disposed in the operating range of the agitation mechanisms 5 and 6. In addition, a cleaning pump 20 is connected to the cleaning mechanism 3.

The control unit 21 controls the overall operation of the automatic analyser 100 including the pumps 18 to 20, 53, 79, and 80, the solenoid valves 52 and 75 to 77, the driving mechanisms 41 and 51a, and the like, performs an operation of dispensing a specimen to be described later, and performs analysis of a specimen on the basis of a measurement result obtained from the spectrophotometer 4.

Here, a dispensing operation in this embodiment will be described with reference to FIGS. 4 and 5.

Figure 4:
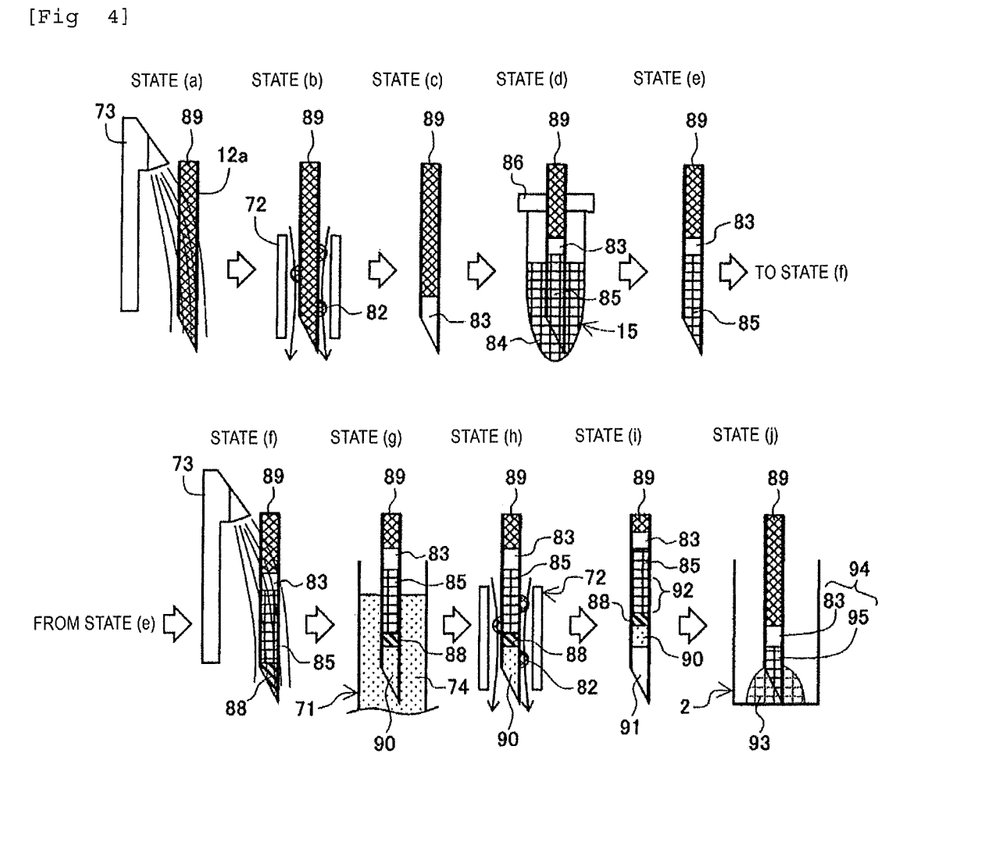
FIG. 4 is a diagram illustrating a flow of an operation of dispensing a specimen in the first embodiment.

FIG. 4 is a diagram illustrating a flow of an operation of dispensing a specimen in this embodiment. FIG. 4 illustrates a case where a specimen is dispensed to the reaction chamber 2 from the closed type specimen chamber 15.

In the dispensing operation, first, the arm 42 is driven by the arm driving mechanism 41 so as to move the specimen nozzle 12a to a cleaning position of the cleaning tank 14, the solenoid valves 52 and 77 are circulated (opened) so as to eject the system water 74 from the cleaning nozzle 73 and the specimen nozzle 12a, the inside and the outside of the specimen nozzle 12a are cleaned, and the inside of the specimen nozzle 12a is filled with the system water 89 (state (a)). At this time, unnecessary materials 94 such as a specimen and segmental air during the previous specimen dispensing operation are discarded. After the cleaning of the specimen nozzle 12a is terminated, the solenoid valves 52 and 77 are blocked (closed).

Subsequently, the specimen nozzle 12a is moved to a vacuum suctioning position, and the solenoid valve 76 is opened, thereby removing water droplets 82 on the outer wall of the specimen nozzle 12a by the water droplet removing portion 72 (state (b)). After the water droplets on the outer wall of the specimen nozzle 12a are removed, the solenoid valve 76 is closed.

Subsequently, the specimen nozzle 12a is moved to the outside of the vacuum suctioning position, and the syringe pump 51 is driven by the syringe pump driving mechanism 51a, thereby suctioning segmental air 83 (volume V1) to the tip end of the specimen nozzle 12a (state (c)).

Subsequently, the specimen nozzle 12a is lowered from above the closed type specimen chamber 15 so as to insert the specimen nozzle 12a into the specimen chamber 15 by making the specimen nozzle pass through the lid member 86 (for example, a rubber cap) of the closed type specimen chamber 15 and to drive the syringe pump 51 in a state where the specimen nozzle 12a is immersed in a specimen 84 within the specimen chamber 15, thereby suctioning a specimen 85 (volume V2) (state (d)). Meanwhile, the volume V2 is set to be sufficiently larger than the amount of specimen which is actually ejected to the reaction chamber 2 and is used for analysis.

Subsequently, the specimen nozzle 12a is pulled out of the lid member 86 to be separated from the specimen chamber 15 (state (e)).

Subsequently, the specimen nozzle 12a is moved to a cleaning position of the cleaning tank 14, and the solenoid valve 77 is opened to eject the system water 74 from the cleaning nozzle 73, so that the outer side of the specimen nozzle 12a is cleaned (state (f)). At this time, the syringe pump 51 is driven so that system water 88 (volume V3) is suctioned to the tip end of the specimen nozzle 12a.

Subsequently, the specimen nozzle 12a is moved to a liquid suctioning position and is immersed in the system water 74 stored in the liquid supply portion 71 so as to drive the syringe pump 51, so that additional system water 90 (volume V4) is suctioned to the tip end of the specimen nozzle 12a (state (g)). Thereafter, the specimen nozzle 12a is separated from the liquid supply portion 71. The solenoid valve 75 is opened for a certain time after being separated from the liquid supply portion 71 of the specimen nozzle 12a to supply the system water 74 to the liquid supply portion 71, and the system water 74 of the liquid supply portion 71 is supplemented and is ejected from the ejection portion 71a to perform replacement by the system water 74 of the liquid supply portion 71. Meanwhile, the system water 88 suctioned in advance in the state (f) is present to the tip end of the specimen nozzle 12a, and thus it is possible to prevent the generation of a dispensing error due to the spreading of the specimen 85 within the specimen nozzle 12a into the system water 74 of the liquid supply portion 71. In addition, the system water 74 of the liquid supply portion 71 is replaced after being separated from the liquid supply portion 71 of the specimen nozzle 12a, and thus it is possible to prevent a specimen component likely to remain in a small amount on the outer wall and the like of the specimen nozzle 12a from remaining in the system water 74 of the liquid supply portion 71.

Subsequently, the specimen nozzle 12a is moved to a vacuum suctioning position, and the solenoid valve 76 is opened, so that the water droplets 82 on the outer wall of the specimen nozzle 12a are removed by the water droplet removing portion 72 (state (h)). After the water droplets on the outer wall of the specimen nozzle 12a are removed, the solenoid valve 76 is closed. Meanwhile, the inner diameter of the specimen nozzle 12a according to this embodiment which dispenses a specimen of approximately 1 uL is equal to or less than 1 mm. On the other hand, an interval between the outer wall of the specimen nozzle 12a and the inner wall of the water droplet removing portion 72 is opened by approximately several millimeters in order to avoid a risk such as a collision. For this reason, a liquid such as system water or a specimen within the specimen nozzle 12a does not come out due to a suctioning force of the vacuum pump 80.

Subsequently, the specimen nozzle 12a is moved to the outside of the vacuum suctioning position, and the syringe pump 51 is driven by the syringe pump driving mechanism 51a, so that air 91 (volume V5) is suctioned to the tip end of the specimen nozzle 12a (state (i)). The air 91 is used as an acceleration section for increasing an ejection speed of the specimen 85 before ejecting a specimen to the reaction chamber 2, and thus the volume V5 of the air 91 may be sufficient to accelerate the specimen. Meanwhile, the volume V5 is approximately 2 µL, and the system water 90 of approximately 15 mm is suctioned, so that the air 91 is suctioned.

Subsequently, the air 91, the system water 90, the system water 88, and a portion of the specimen 85 (see a specimen 92 (volume V6) in state (i)) are ejected in this order by the syringe pump 51 in a state where the specimen nozzle 12a is inserted into the reaction chamber 2 and the tip end of the specimen nozzle 12a is brought into slight contact with the bottom surface of the empty reaction chamber 2 (state (j)). After the system water 90 and 88 (volume V3+V4) and a portion of the specimen 85 (volume V6) are ejected, the specimen nozzle 12a is separated from the reaction chamber 2 and is moved to a cleaning position of the cleaning tank 14 (that is, moved to the state (a)). Thereafter, a dispensing operation accompanied by the state (a) to the state (j) is repeated as necessary.

Meanwhile, in the state (j), the system water 88 and 90 and a specimen 85a are accelerated during the ejection of the air 91 (volume V5). When the speeds of the system water 88 and 90 and the specimen 85 are sufficiently increased, the system water 88 and 90 is first scattered from the tip end of the specimen nozzle 12a. The system water 88 and 90 easily gets wet and spreads on the bottom surface of the reaction chamber 2 when coming into contact with the bottom surface due to their low viscosity, and thus the bottom surface of the reaction chamber 2 and the liquid within the specimen nozzle 12a are connected to each other through the system water 88 and 90. Thereafter, the specimen 92 (volume V6) to be used for analysis continuously flies out from the tip end of the specimen nozzle 12a. In this manner, when the specimen 92 flies out, the liquid such as a specimen within the specimen nozzle 12a and the bottom surface of the reaction chamber 2 are already connected to each other through the system water 88 and 90. Accordingly, even when the specimen 92 has high viscosity, the specimen 92 reliably gets wet and spreads on the bottom surface of the reaction chamber 2 together with the system water 88 and 90 (a mixture 93 of the specimen 92 and the system water 88 and 90), and thus the specimen 92 is not carried back when the specimen nozzle 12a separates from the reaction chamber 2. In addition, a residual specimen 95 (volume V7) remains within the specimen nozzle 12a, and thus the segmental air 83 or the system water 89 does not fly out into the reaction chamber 2.

Meanwhile, in FIG. 4, a description has been given of a case where a specimen is dispensed to the reaction chamber 2 from the closed type specimen chamber 15, but a dispensing operation accompanied by the same state (a) to state (j) can be performed even when a specimen is dispensed to the reaction chamber 2 from the open type specimen chamber 15.

Figure 5:
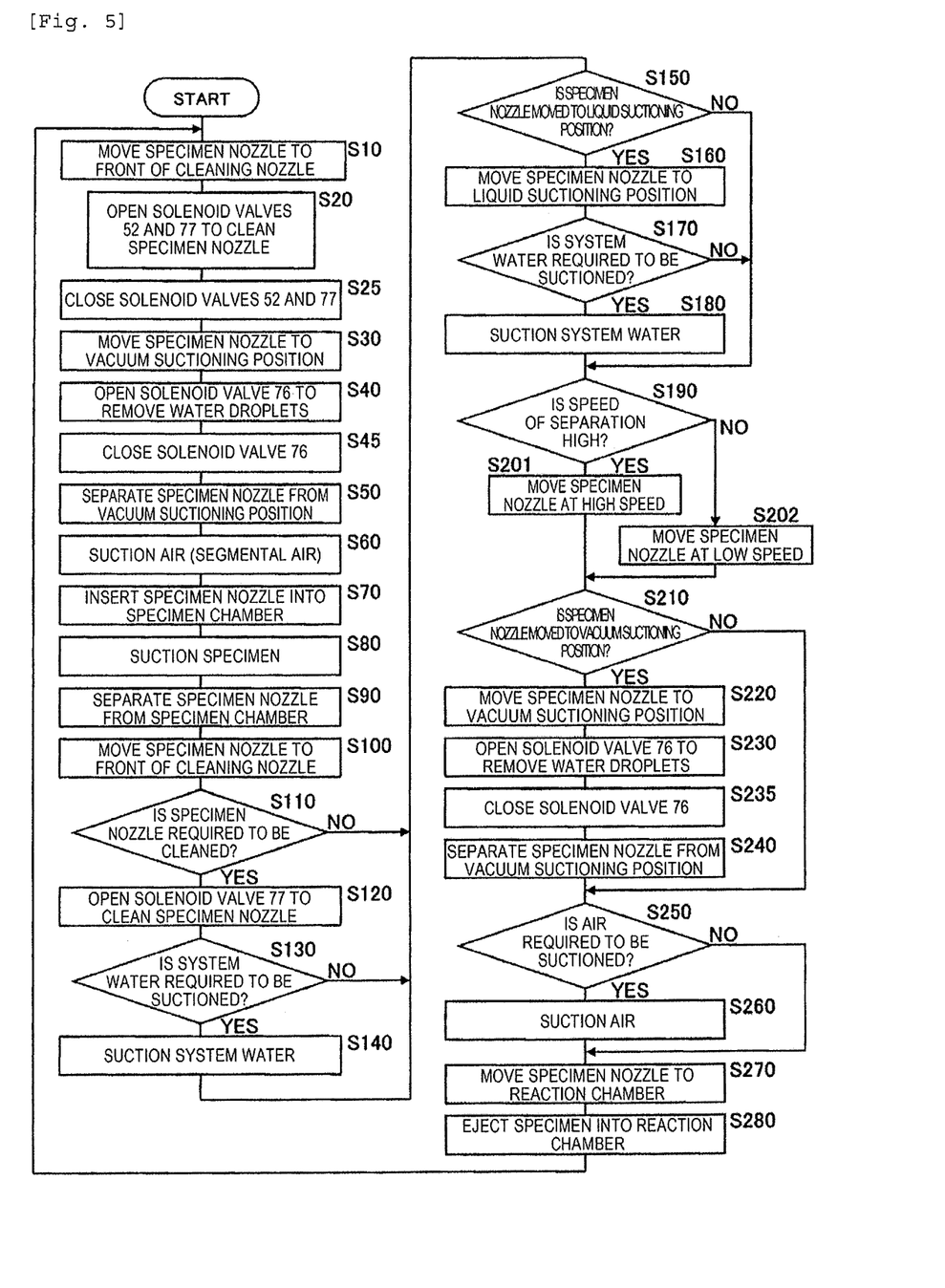
FIG. 5 is a flow chart illustrating details of an operation of dispensing a specimen in the first embodiment.

FIG. 5 is a flow chart illustrating details of an operation of dispensing a specimen in this embodiment.

In FIG. 5, first, the control unit 21 controls the arm driving mechanism 41 to move the specimen nozzle 12a to the front of the cleaning nozzle 73 at a cleaning position of the cleaning tank 14 (step S10), and opens the solenoid valves 52 and 77 to eject the system water 74 from the cleaning nozzle 73 and the specimen nozzle 12a and to clean the specimen nozzle. In a case where the unnecessary materials 94 such as a specimen and segmental air during the previous specimen dispensing operation remain within the specimen nozzle 12a, the unnecessary materials 94 are discarded. In this cleaning step, the outside and inside of the specimen nozzle 12a are cleaned, and the inside of the specimen nozzle 12a is filled with the system water 89 (step S20). Thereafter, the solenoid valves 52 and 77 are closed (step S25).

Next, the specimen nozzle 12a is moved to a vacuum suctioning position (step S30), and the solenoid valve 76 is opened, so that the water droplets 82 on the outer wall of the specimen nozzle 12a are removed by the water droplet removing portion 72 (step S40). Thereafter, the solenoid valve 76 is closed (step S45).

Next, the specimen nozzle 12a is separated from the vacuum suctioning position and is moved to the outside of the vacuum suctioning position (step S50), and the segmental air 83 is suctioned to the tip end of the specimen nozzle 12a (step S60).

Next, the specimen nozzle 12a is inserted into the specimen chamber 15 (step S70), and the specimen 85 is suctioned (step S80).

Next, the specimen nozzle 12a is separated from the specimen chamber 15 (step S90), and the specimen nozzle 12a is moved to a cleaning position in front of the cleaning nozzle of the cleaning tank 14 (step S100).

Here, it is determined whether or not the outer wall of the specimen nozzle 12a is required to be cleaned, on the basis of an operation condition (hereinafter, referred to as a dispensing operation condition) of a dispensing operation which is set in the control unit 21 in advance (step S110). In a case where the determination result is YES, the solenoid valve 77 is opened to eject the system water 74 from the cleaning nozzle 73 and to clean the outer side of the specimen nozzle 12a (step S120). Subsequently, it is determined whether or not the system water 88 is required to be suctioned to the tip end of the specimen nozzle 12a on the basis of the dispensing operation condition (step S130). In a case where the determination result is YES, the system water 88 is suctioned to the tip end of the specimen nozzle 12a (step S140). Meanwhile, in steps S110 and S130, a case where the cleaning of the specimen nozzle and the suctioning of the system water 88 are not necessary (that is, the determination results in step S110 and step S130 are NO) includes a case where it is previously known that the viscosity of a specimen to be dispensed which is accommodated in the specimen chamber 15 is low (for example, a case where the specimen is not whole blood but manually hemolyzed blood) or a case where the amount of specimen dispensed is relatively large (for example, a case of approximately 10 uL). Meanwhile, there is also a case where the cleaning of the specimen nozzle is necessary, and the suctioning of the system water 88 is unnecessary. For example, a case of the manually hemolyzed blood is a case where the specimen attached to the vicinity of the specimen nozzle 12*a* is desired to be removed, but the system water is not required to be suctioned due to low viscosity of the specimen. Which flow the specimen follows can be realized by determining a dispensing operation condition in advance and determining whether or not the specimen to be analyzed matches this condition.

In a case where the determination results in steps S110 and S130 are NO or in a case where the process of step S140 is terminated, it is determined whether or not the specimen nozzle 12*a* is required to be moved to a liquid suctioning position (step S150). In a case where the determination result is YES, the specimen nozzle 12*a* is moved to the liquid suctioning position (step S160). Subsequently, it is determined whether or not the system water 90 is required to be suctioned to the tip end of the specimen nozzle 12*a*, on the basis of the dispensing operation condition (step S170). In a case where the determination result is YES, the system water 90 is suctioned to the tip end of the specimen nozzle 12*a* (step S180). Meanwhile, in step S170, a case where the system water 90 is not required to be suctioned (that is, the determination result in step S180 is NO) includes a case where it is previously known that the viscosity of a specimen to be dispensed which is accommodated in the specimen chamber 15 is low (for example, a case where the specimen is not whole blood but manually hemolyzed blood) or a case where the amount of specimen dispensed is relatively large (for example, a case of approximately 10 uL).

In a case where the determination results in steps S150 and S170 are NO or in a case where the process of step S180 is terminated, it is determined whether or not the speed of separation of the specimen nozzle 12*a* from the liquid suctioning position is high (high-speed separation) on the basis of the dispensing operation condition (step S190). In a case where the determination result is YES, the specimen nozzle 12*a* is separated from the liquid suctioning position at high speed (step S201). In a case where the determination result is NO, the specimen nozzle 12*a* is separated from the liquid suctioning position to such an extent that water droplets on the outer wall of the specimen nozzle 12*a* are removed (step S202). Thereby, it is possible to control the amount of water droplets on the outer wall of the specimen nozzle 12*a*. For example, in a case where step 230 to be described later includes a step of removing water droplets, it is possible to give priority to a movement speed of the specimen nozzle 12*a* over the control of the amount of water droplets. On the other hand, in a case where a step of removing water droplets in step 230 to be described later is not performed, it is possible to reduce the movement speed of the specimen nozzle 12*a* in order to give priority to the removal of water droplets in step 202.

When the processes of steps S201 and S202 are terminated, it is subsequently determined whether or not it is necessary to move the specimen nozzle 12*a* to a vacuum suctioning position on the basis of the dispensing operation condition (step S210). In a case where the determination result is YES, the specimen nozzle 12*a* is moved to the vacuum suctioning position (step S220), and the solenoid valve 76 is opened so as to remove the water droplets 82 on the outer wall of the specimen nozzle 12*a* by the water droplet removing portion 72 (step S230). Thereafter, the solenoid valve 76 is closed (step S235), and the specimen nozzle 12*a* is separated from the vacuum suctioning position and is moved to the outside of the vacuum suctioning position (step S240).

In a case where the determination result in step S210 is NO or in a case where the process of step S240 is terminated, it is determined whether or not it is necessary to suction the air 91 to the tip end of the specimen nozzle 12*a* on the basis of the dispensing operation condition (step S250). In a case where the determination result is YES, the air 91 is suctioned to the tip end of the specimen nozzle 12*a* (step S260). In a case where the determination result in step S250 is NO or in a case where the process of step S250 is terminated, the specimen nozzle 12*a* is moved to (inserted into) the reaction chamber 2 (step S270) and ejects a specimen into the reaction chamber 2 (step S280), and the operation returns to step S10.

Next, a specific example will be described. A description will be given of a case where the specimen nozzle 12*a* ejects a small amount of whole blood and manually hemolyzed blood which is hemolyzed in advance to a reaction chamber. This difference can be recognized by a device on the basis of identification information such as a bar code attached to a specimen chamber or identification information such as a bar code attached to the specimen rack 16. The flow of FIG. 5 is determined on the basis of the identification information and a dispensing operation condition, and a dispensing operation of the specimen nozzle 12*a* is performed on the basis of the determined flow.

In a case of a small amount of whole blood, steps S110, S130, S150, S170, S190, and S250 follow a flow of YES in the flow of FIG. 5. Thereby, it is possible to solve a problem that a specimen is carried back to the specimen nozzle when the specimen nozzle 12*a* separates from the reaction chamber. Even in the case of a small amount of whole blood, some steps can be omitted as described later, and at least any one step of steps S140 and S180 is essential. That is, in a case of whole blood, the control unit controls the second specimen dispensing mechanism 12 so as to perform the specimen suctioning (specimen suctioning process) in step S80, the suctioning (liquid suctioning process) of system water in any one of steps S140 and S180, and the ejection (specimen ejection process) of a specimen in step S280.

On the other hand, in the case of a manually hemolyzed blood, the determination results in steps S110 and S150 are YES in the flow of FIG. 5, and steps S130, S170, S190, S210, and S250 follow a flow of NO. This is because particularly in the case of a manually hemolyzed blood, a problem that a specimen is carried back is not likely to occur. It is possible to omit the suctioning (liquid suctioning process) of system water in any one of steps S140 and S180. That is, in the case of a manually hemolyzed blood, it is desired that the control unit controls the second specimen dispensing mechanism 12 so as to eject a portion of the specimen to the reaction chamber without performing the suctioning (liquid suctioning process) of system water in step S140 or step S180.

Next, main points of this embodiment will be described. As described so far, it is important to solve a problem of carrying-back in the case of a small amount of whole blood (for example, equal to or less than 5 μL). For this reason, a liquid having viscosity or specific gravity lower than that of a specimen is suctioned by the specimen nozzle 12*a* (liquid suctioning process) after the specimen is suctioned by the specimen nozzle 12*a* (after the specimen suctioning process), and the liquid and a portion of the specimen are ejected to an empty reaction chamber in this order from the specimen nozzle (ejection process). Since the liquid gets wet and spreads on the bottom of a reliable empty reaction chamber and the bottom of the reaction chamber and a portion of the specimen are connected to each other, it is possible to eject a portion of the specimen to the bottom of the reaction chamber without carrying the specimen back.

This liquid may be supplied from any location as long as the liquid can be suctioned before the suctioning and ejection of the specimen. For example, it is considered that the liquid is suctioned from a liquid storage portion. Alternatively, it is considered that a cleaning solution to be ejected from a cleaning nozzle is suctioned. In the former case, there is an advantage in that the amount of liquid suctioned is stabilized because the liquid is suctioned from the storage portion. On the other hand, in the latter case, the stability of the amount of liquid suctioned is not sufficient because a flowing cleaning solution is suctioned. However, the liquid can be suctioned at a cleaning timing of the specimen nozzle, and thus there is an advantage in that it is possible to suction the liquid without stopping by the storage portion and to suction the liquid in a relatively short period of time. It is considered that the liquid is suctioned from anything. However, the invention is not limited to suctioning from these two locations. Meanwhile, the amount of liquid is, for example, approximately 1 µL.

In addition, the second main point is air suctioning in step S260. That is, it is desired that air suctioning (air suctioning process) is performed in addition to the above-described liquid suctioning, and the liquid is ejected together with air during the ejection of the specimen. The problem of carrying-back of a specimen is drastically improved without performing air suctioning, but reliability increases by performing air suctioning. This is because a run-up distance for increasing ejection speeds of the liquid and the specimen during the ejection of the liquid is generated, which makes the ejected specimen itself easily separate from the tip end of the specimen nozzle.

In addition, the third main point is the suctioning of system water separately in twice of steps S140 and S170. In this case, the suctioning of system water in step S170 is equivalent to the above-described suctioning of the liquid (equivalent to a liquid suctioning process). On the other hand, step S140 has an operation different from the above-described solution of carrying-back. As described in the above-described state (f), it is possible to prevent the specimen from spreading to the system water of the liquid supply portion 71. Thereby, it is possible to prevent the generation of a dispensing error caused by the spreading. Accordingly, it is desired to suction the system water separately in twice.

However, in this case, the first system water does not necessarily need to be suctioned. That is, even when the water is not suctioned, a small amount of water may be introduced (added) to the tip end of the specimen nozzle 12a. In this case, step S140 can be replaced as a cleaning water introducing process of introducing system water (cleaning water) into the specimen nozzle, rather than a liquid suctioning process. For example, as a method of introducing water, it is considered that a specimen is slightly suctioned, and an empty space is provided in the specimen nozzle 12a and is filled with system water (cleaning water) ejected from a cleaning nozzle, in addition to directly suctioning water.

Operational effects of this embodiment configured as described above will be described.

In a case where a specimen is directly obtained without opening a cap from a specimen chamber such as a vacuum blood collection tube of which the opening end is closed with a rubber cap or the like, a specimen nozzle of a dispensing device directly penetrates the rubber cap or the like and is immersed in the specimen within the specimen chamber, and thus it is necessary to consider an insertion load to be applied to the specimen nozzle. Therefore, a specimen nozzle used for penetration of a rubber cap or the like of a closed type specimen chamber is required to have a larger outer diameter than that of a specimen nozzle used for an open type specimen chamber and to have a sharp tip end in consideration of a reduction in an insertion load into the rubber cap or the like.

However, in a case where the outer diameter of a specimen nozzle is large and the tip end thereof is sharp, the force of ejection is decreased due to a wide opening of the specimen nozzle, and the opening has to be inclined to the bottom surface of a reaction chamber, which makes it difficult for a specimen to separate from the tip end of the specimen nozzle. In particular, in a case where a specimen, such as whole blood or a centrifugally separated blood corpuscle, which has high viscosity, is dispensed, it is extremely difficult to make the specimen get wet and spread on the bottom surface of the reaction chamber, and thus there is a problem in that the specimen is carried back to the specimen nozzle when the specimen nozzle separates from the reaction chamber.

On the other hand, in this embodiment, a configuration is adopted in which cleaning water ejected from the cleaning nozzle of the cleaning tank 14 is suctioned by the specimen nozzle 12a as necessary or a liquid of the liquid supply portion 71 is suctioned by the specimen nozzle 12a as necessary in a case where a specimen to be analyzed is dispensed by the specimen nozzle 12a, and the liquid and a portion of the specimen are ejected in this order to the reaction chamber 2 from the specimen nozzle 12a, and thus it is possible to dispense a small amount of specimen with a high level of accuracy without depending on the outer shape of the specimen nozzle 12a or the viscosity of the specimen. In addition, it is desired to introduce water for preventing the above-described air suctioning or the spreading of the specimen to the tip end of the specimen nozzle.

Meanwhile, in this embodiment, a volume V10 of the specimen 92 and the volumes V3 and V4 of the system water 88 and 90 do not change even in a case of the open type specimen chamber 15, and thus it is possible to dispense a small amount of specimen with a high level of accuracy without depending on whether the specimen chamber 15 is a closed type or open type.

Second Embodiment

A second embodiment of the invention will be described in detail with reference to FIG. 6.

This embodiment is configured such that, instead of system water, a reagent used for analysis of a specimen is supplied to the liquid supply portion in the first embodiment.

Figure 6:
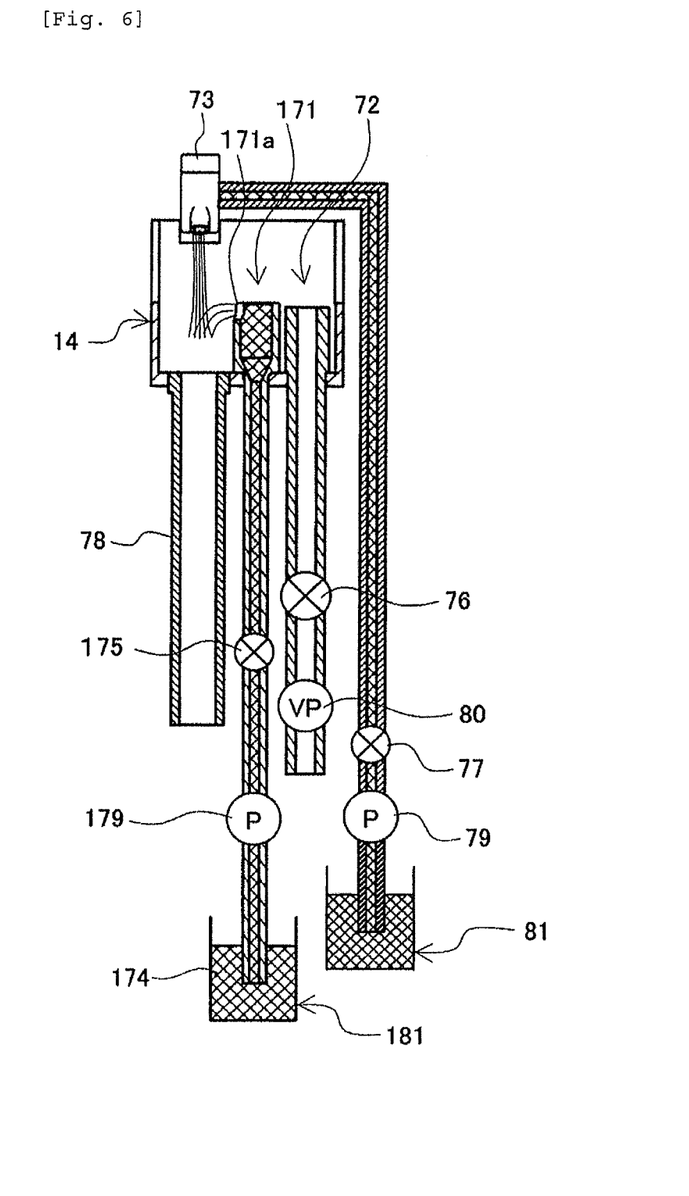
FIG. 6 is a schematic longitudinal sectional view illustrating a cleaning tank, a liquid supply portion, and a water droplet removing portion which are taken out in a second embodiment.

FIG. 6 is a schematic longitudinal sectional view illustrating a cleaning tank, a liquid supply portion, and a water droplet removing portion which are taken out in this embodiment. In the drawing, the same members as those in the first embodiment will be denoted by the same reference numerals and signs, and a description thereof will not be repeated.

As illustrated in FIG. 6, a cleaning tank 14 is provided with a cleaning nozzle 73 that cleans a specimen nozzle 12a by ejecting system water 74, which is stored in a water tank 81 and is supplied by a pump 79, as cleaning water. In addition, a pipe line connecting the pump 79 and the cleaning nozzle 73 is provided with a solenoid valve 77 for opening and closing the pipe line (switching between circulation and blocking). In the cleaning tank 14, the cleaning water ejected from the cleaning nozzle 73 passes through a cleaning position where the specimen nozzle 12a is cleaned, and is discarded to a waste liquid tank (not shown) through a waste liquid port 78 provided below the cleaning tank.

A reagent 174 stored in a reagent tank 181 is supplied to a liquid supply portion 171 by a pump 179, and a pipe line connecting the liquid supply portion 171 and the pump 179 is provided with a solenoid valve 175 for opening and closing a pipe line (switching between circulation and blocking). The liquid supply portion 171 is disposed so as to be adjacent to the cleaning tank 14, and ejects a portion of the reagent 174 to the cleaning position of the cleaning tank 14 from an ejection portion 171a provided on the cleaning tank 14 side of the liquid supply portion 171.

A vacuum pump 80 is connected to a water droplet removing portion 72, and a pipe line connecting the water droplet removing portion 72 and a vacuum pump 80 is provided with a solenoid valve 76 for opening and closing the pipe line (switching between circulation and blocking). In the water droplet removing portion 72, water droplets suctioned from the outer wall of the specimen nozzle 12a are discarded to a waste liquid tank (not shown) through the vacuum pump 80.

In step S170 of FIG. 5, replacement by a reagent is performed, and the other configurations are the same as those in the first embodiment.

Also in this embodiment configured as described above, it is possible to obtain the same effects as those in the first embodiment.

Meanwhile, the invention is not limited to the above-described embodiments, and includes various modification examples. For example, the above-described embodiments are described in detail in order to facilitate the understanding of the invention, and do not necessarily include all of the configurations described above.

For example, the numerical values are examples, and are not limited thereto. In addition, a description has been given of a case where the tip end of the specimen nozzle 12a is brought into slight contact with the bottom surface of the reaction chamber 2 during the ejection of a specimen, but the tip end may not be necessarily brought into contact therewith. However, the bottom surface and the tip end of the specimen nozzle are physically connected to each other by a contact therebetween, and thus there is an advantage in that the reliability of solution of a problem of carrying-back is further increased.

REFERENCE SIGNS LIST

1: Reaction Disk
2: Reaction Chamber
3: Cleaning Mechanism
4: Spectrophotometer
5, 6: Agitation Mechanism
7, 8: Reagent Dispensing Mechanism
7a, 8a: Reagent Nozzle
9: Reagent Disk
10: Reagent Bottle
11: First Specimen Dispensing Mechanism
11a: Specimen Nozzle
12: Second Specimen Dispensing Mechanism
12a: Specimen Nozzle
14: Cleaning Tank
15: Specimen Chamber
16: Specimen Rack
17: Specimen Transport Mechanism
18: Reagent Pump
19: Specimen Pump
20: Cleaning Pump
21: Control Unit
30, 31: Cleaning Tank
41: Arm Driving Mechanism
42: Arm
51: Syringe Pump
51a: Syringe Pump Driving Mechanism
52, 75 to 77, 175: Solenoid Valve
53, 79, 179: Pump
71, 171: Liquid Supply Portion
71a, 171a: Ejection Portion
72: Water Droplet Removing Portion
73: Cleaning Nozzle
74, 88, 89, 90: System Water
80: Vacuum Pump
81: Water Tank
82: Water Droplet
83: Segmental Air
84, 85, 92: Specimen
86: Lid Member
91: Air
94: Unnecessary Material
181: Reagent Tank
100: Automatic Analyser

The invention claimed is:

1. An automatic analyser comprising:
a specimen dispensing mechanism that includes a specimen nozzle, a first pump and a first valve;
a nozzle connected to a first channel that is connected to a second pump and a second valve, the nozzle configured to eject liquid onto the specimen nozzle and into a cleaning tank;
a second channel connected to a third valve and the second pump; and
a controller connected to the specimen dispensing mechanism, the pump, the first valve, the second valve and the third valve, the controller programmed to:
perform a specimen suctioning process of controlling the specimen dispensing mechanism to insert the specimen nozzle into a specimen chamber holding a specimen and driving the first pump to suction the specimen in the specimen chamber,
perform a cleaning water introducing process of controlling the specimen dispensing mechanism to move the specimen nozzle to the cleaning tank after the specimen suctioning process and controlling the second valve to eject the liquid through the nozzle connected to the first channel onto the specimen nozzle,
perform a first liquid suctioning process of controlling the specimen dispensing mechanism to move the specimen nozzle to the second channel after the cleaning water introducing process and driving the first pump to suction a first volume of liquid,
perform an air suctioning process of driving the first pump to suction air after the liquid suctioning process, and
perform an ejection process of driving the first pump to eject the air before the liquid, and eject the liquid before a portion of the specimen is ejected from the specimen nozzle to a reaction chamber.

2. The automatic analyser according to claim 1, wherein the liquid is water or a reagent to be used for analysis of the specimen.

3. The automatic analyser according to claim 1,
wherein the specimen includes whole blood or manually hemolyzed blood which is hemolyzed in advance,
wherein the controller is programmed to:
upon determining the specimen is whole blood, of the specimen suctioning process, the cleaning water introducing process, the liquid suctioning process and the air suctioning process, perform only the specimen suctioning process and the liquid suctioning process, and
upon determining the specimen is manually hemolyzed blood, perform the ejection process without performing the liquid suctioning process.

4. The automatic analyser according to claim 1,
wherein the specimen chamber is a closed type specimen chamber in which an opening provided in an upper portion is closed with a lid member, and
wherein the specimen nozzle is formed to be capable of penetrating the lid member.

5. The automatic analyser according to claim 1, further comprising:
a spectrophotometer connected to the controller that measures absorbance of a reaction solution of the specimen and a reagent,
wherein the spectrophotometer measures an absorbance of the reaction solution generated by ejection of the reagent into the reaction chamber in which the liquid and a portion of the specimen are ejected.

6. The automatic analyser according to claim 1,
wherein the controller is programmed to:
after the cleaning water introducing process and before the first liquid suctioning process, perform a second liquid suctioning process of driving the first pump to suction a second volume of liquid,
wherein the second volume of liquid is less than the first volume of liquid.

7. An analysis method in an automatic analyser including a specimen dispensing mechanism that includes a specimen nozzle, a specimen dispensing mechanism that includes a specimen nozzle, a first pump and a first valve;
a nozzle connected to a first channel that is connected to a second pump and a second valve, the nozzle configured to eject liquid onto the specimen nozzle and into a cleaning tank; and
a second channel connected to a third valve and the second pump,
the analysis method comprising:
a specimen suctioning processing step of inserting the specimen nozzle into a specimen chamber holding a specimen and driving the first pump to suction the specimen in the specimen chamber;
a liquid suctioning processing step of moving the specimen dispensing mechanism to move the specimen nozzle to the cleaning tank after the specimen suctioning processing step, and controlling the second valve to eject the liquid through the nozzle connected to the first channel onto the specimen nozzle;
a liquid suctioning step of controlling the specimen dispensing mechanism to move the specimen nozzle to the second channel after the cleaning water introducing process and driving the first pump to suction the liquid,
an air suctioning step of driving the first pump to suction air after the liquid suctioning process, and
an ejection processing step of driving the first pump to eject the air before the liquid and eject the liquid before a portion of the specimen is ejected the specimen nozzle to a reaction chamber.

\* \* \* \* \*